(12) United States Patent
Voth

(10) Patent No.: US 8,747,724 B2
(45) Date of Patent: Jun. 10, 2014

(54) BLOW MOLDING MACHINE AND METHOD FOR PRODUCING HOLLOW BODIES

(75) Inventor: Klaus Voth, Obertraubling-piesenkofen (DE)

(73) Assignee: Krones AG, Neutraubling (DE)

( * ) Notice: Subject to any disclaimer, the term of this patent is extended or adjusted under 35 U.S.C. 154(b) by 129 days.

(21) Appl. No.: 12/829,498

(22) Filed: Jul. 2, 2010

(65) Prior Publication Data

US 2011/0001274 A1 Jan. 6, 2011

(30) Foreign Application Priority Data

Jul. 3, 2009 (DE) .......................... 10 2009 031 681

(51) Int. Cl.
 *B29C 43/22* (2006.01)
(52) U.S. Cl.
 USPC ......................................................... 264/503
(58) Field of Classification Search
 USPC ......................................................... 264/503
 See application file for complete search history.

(56) References Cited

U.S. PATENT DOCUMENTS

| | | | |
|---|---|---|---|
| 4,473,515 A | 9/1984 | Ryder | |
| 4,929,450 A | 5/1990 | Takakusaki et al. | |
| 2003/0118686 A1 | 6/2003 | Voth et al. | |
| 2004/0155386 A1* | 8/2004 | Gonda et al. | 264/523 |

FOREIGN PATENT DOCUMENTS

| | | |
|---|---|---|
| CN | 2340603 Y | 9/1999 |
| DE | 102004012124 A1 | 10/2005 |
| EP | 1328396 A1 | 7/2003 |
| EP | 1574418 A1 | 9/2005 |
| JP | 53054263 A | 5/1978 |
| JP | 62140607 A | 6/1987 |
| JP | 1076260 | 3/1998 |
| WO | WO 02/34500 A1 | 5/2002 |
| WO | WO-2004098862 A2 | 11/2004 |

OTHER PUBLICATIONS

Chinese Office Action for 201010223377.5, dated Aug. 24, 2012.
The State Intellectual Property Office of P.R. China, Notification of First Office Action, Application No. 201110303826.1, dated Feb. 5, 2013.
Notification of the Third Office Action, The State Intellectual Property Office of the People's Republic of China, Application No. 201010223377.5 dated Sep. 26, 2013.

* cited by examiner

*Primary Examiner* — Larry Thrower
(74) *Attorney, Agent, or Firm* — Marshall, Gerstein & Borun LLP

(57) ABSTRACT

A blow molding machine for producing hollow bodies, particularly wide-necked containers, having a blow nozzle and a blow mold for accommodating a preform. To save air during the blowing process in a simple way, a plunger is introduced into the preform during the blowing operation.

6 Claims, 1 Drawing Sheet

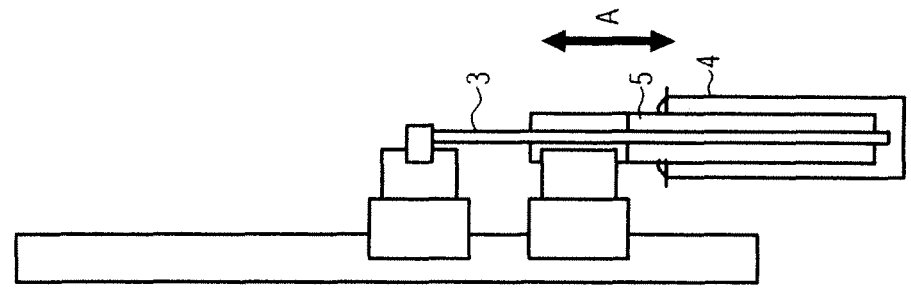
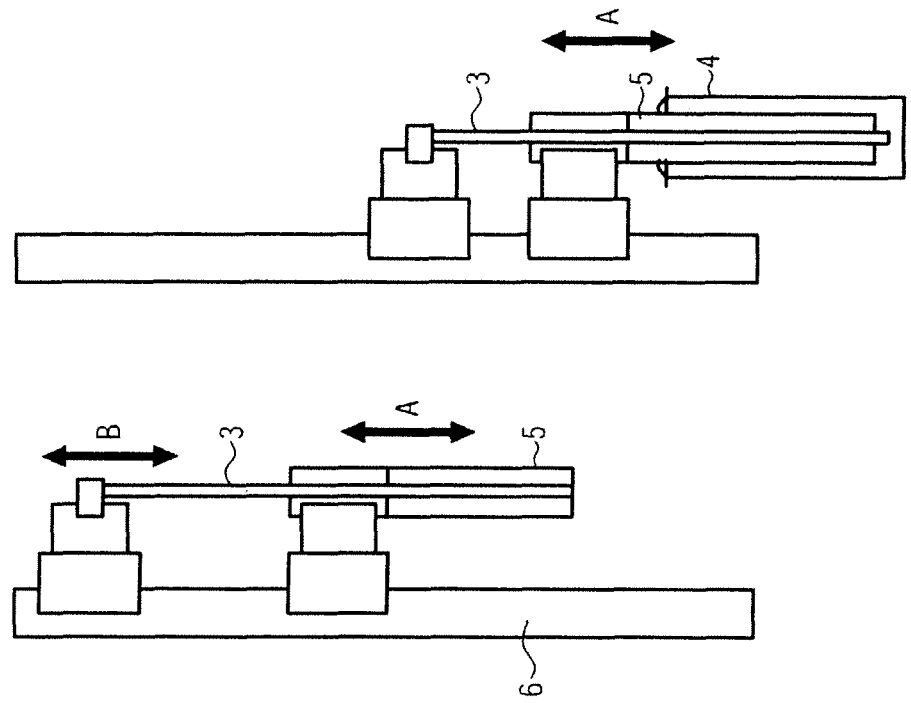
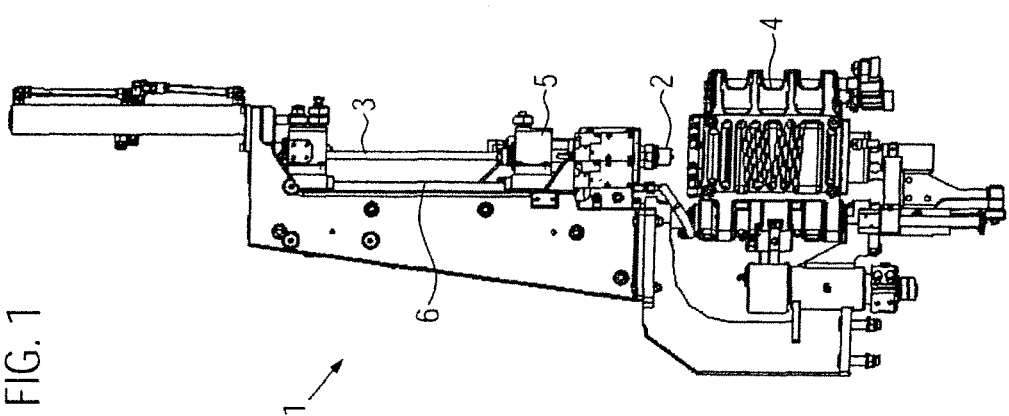

BLOW MOLDING MACHINE AND METHOD FOR PRODUCING HOLLOW BODIES

CROSS-REFERENCE TO RELATED APPLICATION

The present application claims the benefit of priority of German Application No. 102009031681.7, filed Jul. 3, 2009. The entire text of the priority application is incorporated herein by reference in its entirety.

FIELD OF THE DISCLOSURE

The present disclosure refers to a blow molding machine and to a method for producing hollow bodies of the type used in forming containers.

Such a blow molding machine is known from EP 1 328 396. The known blow molding machine includes a split blow mold into which a preform is inserted that is then pressed with the help of compressed air out of a blow nozzle against the walls of the blow mold and is thereby shaped into the hollow body. A relatively great amount of air is however needed for blow molding the hollow body, and the air consumption is here relatively high especially in the manufacture of wide-necked containers, such as e.g. cups or cans or the like. With the great number of hollow bodies produced, this air consumption is striking under procedural and economic aspects.

EP 1 574 418 discloses a method in which the attempt is made to save blow air in that the blow air supply is shut off before the stretching mandrel as is used there is retracted from the hollow mold. Due to the switching off of the blow air the volume previously occupied by the stretching mandrel is no longer filled with air, so that air is here not needed any more. It has been found that the small pressure drop caused thereby has no negative impacts on the blow result. The amount of blow air saved is however relatively small.

SUMMARY OF THE DISCLOSURE

It is the object of the present disclosure to provide a blow molding machine, and a method for blow molding hollow bodies, with which blow air can be saved.

Owing to the inventive use of a plunger that can be introduced into the preform during the blowing operation, the interior of the preform portion already in contact with the blow mold is filled fully or at least in part, so that blow air is no longer needed there for maintaining the blow pressure. A much greater portion of blow air is thereby already saved during the blow molding operation.

If the outer diameter of the piston substantially corresponds to the inner diameter of the neck of the hollow body, it can also perform a sealing function to prevent the escape of the blow air.

Preferably, the plunger is arranged to be coaxial to the blow nozzle and also coaxial to a stretching mandrel assigned to the blow nozzle.

The plunger is preferably controlled via a cam control.

Preferably, the plunger is movable independently of the blow nozzle and independently of a stretching mandrel.

The air supply through the blow nozzle and the movement of the plunger can be controlled such that the plunger compresses the blow air already contained in the hollow body, so that the plunger also helps to increase the pressure during blowing.

When the plunger is introduced after the first low pressure level has been reached, care can be taken through a corresponding process control that the plunger compresses the blow air such that a second pressure level is reached also without a (considerable) additional blow air supply so that blow air need no longer be supplied to the blow nozzle at two different pressure levels. In there is a stretching mandrel, the plunger is preferably introduced after the stretching mandrel has performed its function.

BRIEF DESCRIPTION OF THE DRAWINGS

An embodiment of the disclosure shall now be explained in more detail with reference to the drawings, in which:

FIG. 1 shows a blow molding station of a blow molding machine according to the disclosure;

FIG. 2 is a schematic illustration of the blow molding station prior to start of work; and FIG. 3 is a schematic illustration of the blow molding station after the end of work.

DETAILED DESCRIPTION OF THE PREFERRED EMBODIMENT

FIG. 1 shows one of the blow molding stations 1 of a blow molding machine, which is here configured as a stretch blow molding machine, i.e. it contains a stretching rod 3 apart from a blow nozzle 2. As a rule, the stretching rod 3 is coaxially arranged inside the blow nozzle 2 and is movable relative to the blow nozzle 2. A hollow mold 4 is positioned underneath the blow nozzle 2; a preform (not shown here) is inserted into the hollow mold in the customary way and is pressed by way of blowing by means of the blow nozzle 2 and by mechanical stretching with the help of the stretching mandrel 3 against the inner walls of the hollow mold 4 so as to achieve the desired shape.

The blow nozzle 2 and the stretching rod 3 are controlled in the customary way via a pneumatic cylinder and a cam.

According to the disclosure a blow plunger 5 is provided, in addition to the blow nozzle 2 and the stretching rod 3. The blow plunger 5 is arranged to be coaxial to the blow nozzle 2 and the stretching rod 3 and surrounds both members. The blow plunger 5, however, is movable independently of the stretching rod 3 and the blow nozzle 2 and, in contrast to the stretching rod 3, it is not configured for any mechanical stretching contact with the bottom portion of the preform. The movement of the blow plunger 5 towards the blow mold 4, into the blow mold 4 and away from said mold is preferably accomplished through a cam control (not shown), but can also be accomplished pneumatically or electrically. The plunger 5 serves to fill the interior of the preform at least in part and has a larger outer diameter than the stretching rod 3 and the blow nozzle 2, respectively, but the diameter is dimensioned such that the blow plunger can enter through the neck of a preform into the interior of the preform. When wide-necked containers, such as plastic cans or cups or the like, are produced, the plunger may have a particularly large outer diameter, whereby its efficiency is intensified. The diameter of the piston can be increased up to the inner diameter of the neck of the preforms/containers, so that it can also help to seal the neck opening during the blow molding process. The plunger 5 is preferably shaped as a cylinder with a constant outer diameter. The axial length of the plunger may correspond to the axial length of the hollow mold 4 (height of the finished hollow body), but may also be slightly larger, and project out of the hollow mold 4 in the end position, but it may also be smaller.

The blow nozzle 4, the stretching rod 3 and the plunger 5 are arranged on a joint vertical guide 6, which ensures a strictly coaxial movement of the blow nozzle 2, the stretching rod 3 and the plunger 5 in the direction of the double-headed arrows A.

To produce a hollow body, the process is first carried out in the customary way, i.e. the preform is inserted into the blow mold 4 and the blow nozzle 2 as well as the stretching mandrel or stretching rod 3 move along and into the preform; by blowing in blow air at the standard pressure (first pressure level) with the support of the mechanical stretching operation by the stretching mandrel, which comes to rest on the inner wall of the preform in the area of the later bottom of the hollow body and stretches said body, the preform is increased in its width and length. After the preform has reached an adequate inner volume, the plunger 5 becomes operative. Controlled by the cam control, the plunger is moved through the neck of the preform into the interior thereof. At the same time the stretching mandrel stops its stretching movement and retracts. The plunger more and more occupies the interior of the preform, so that it need not be filled with air at said place although the volume of the interior of the preform is further increased by continuous blowing.

At the same time it can be ensured by introducing the plunger and by means of a matching blow program of the blow nozzle that the piston compresses the blow air in the interior of the preform, so that the plunger also contributes to an increase in pressure in the interior of the preform without the need that the whole blow air that has so far been needed for achieving said pressure has to be blown in for this purpose.

This even has the effect that with the blow plunger the blow air in the interior of the preform can be raised to a second pressure level, so that this increase in pressure need not be carried out by controlling the blow air supply via the blow nozzle 2. A standard stretch blow molding operation with blow nozzle, stretching rod and two-stage pressure progress (P1 and P2) can be carried out in this way without the need for providing compressed air at a second higher pressure (P2).

Of course, the blow nozzle can nevertheless contribute to an increase in pressure to P2 if this is needed for some reason or other.

The diameter of the plunger can be chosen in response to the preform used and in response to the end product of the hollow body; with a 0.5 l PET can (in the form of the standard tin cans), the stretching plunger may have an outer diameter of about 50 mm, which is tantamount to a saving of blow air of about 0.29 l blow air per blow molding operation.

In a modification of the described and plotted embodiment the plunger according to the disclosure can also be used in blow molding machines of different designs. The plunger can assume any desired diameter and any length that is expedient for the respectively used preform.

The invention claimed is:

1. A method for blow molding a hollow body from a preform having a neck, comprising inserting the preform into a hollow mold and shaping the pre-form to the hollow body with assistance of blow air supplied at a beginning of a blowing process through a blow nozzle under a first standard pressure level to obtain the hollow body during the blowing process, moving a stretching mandrel coaxially-arranged inside the blow-nozzle through the neck and into the pre-form until the stretching mandrel comes into stretching contact with a pre-form bottom portion and further on stretches the pre-form in its length for supporting the blowing process by a mechanical pre-form stretching operation, wherein after the beginning of the blowing process by stretching the pre-form in its width by the blow air at the first standard pressure level and in its length by the mechanical perform stretching operation of the stretching mandrel until the pre-form has reached an adequate inner volume with at least a portion of the pre-form contacting the hollow mold, introducing a plunger, the plunger being a cylinder with a constant outer diameter larger than the diameter of the stretching mandrel and being coaxial to the blow nozzle and the stretching mandrel and being movable independent of the blow nozzle and the stretching mandrel through the neck into the pre-form after the first standard pressure level is reached, the plunger, as it is being introduced into the pre-form, occupying an increasing volume of the interior of the pre-form so that the occupied volume in the pre-form is not to be filled with blowing air during the further progress of the blowing process by introducing further blow air for reaching a second higher pressure level than the first standard pressure level.

2. The method according to claim 1, compressing the blow air contained in the preform at the first standard pressure level by introducing the plunger.

3. The method according to claim 1, and compressing the air contained in the preform to the first standard pressure level to reach the second higher pressure level by introducing the plunger.

4. The method according to claim 1, and additionally blowing in air during introduction of the plunger.

5. The method according to claim 1, and introducing the plunger after termination of an introducing movement of the stretching mandrel.

6. The method according to claim 1, wherein the plunger constant outer diameter maximally corresponds to the inner diameter of the neck of the pre-form.

\* \* \* \* \*